United States Patent
Mueller et al.

(10) Patent No.: US 7,303,709 B2
(45) Date of Patent: Dec. 4, 2007

(54) COMPRESSION MOLDING PROCESS

(75) Inventors: Bruce M. Mueller, Bozeman, MT (US); Ben Nejad, Evansville, IN (US); Dieter F. Lay, Oconomowoc, WI (US)

(73) Assignee: Seaquist Closures Foreign, Inc., Crystal Lake, IL (US)

( * ) Notice: Subject to any disclaimer, the term of this patent is extended or adjusted under 35 U.S.C. 154(b) by 112 days.

(21) Appl. No.: 10/796,352

(22) Filed: Mar. 9, 2004

(65) Prior Publication Data

US 2004/0169307 A1 Sep. 2, 2004

Related U.S. Application Data

(62) Division of application No. 10/036,761, filed on Dec. 21, 2001, now abandoned.

(51) Int. Cl.
*B29B 9/00* (2006.01)
*B29C 43/02* (2006.01)

(52) U.S. Cl. .............. 264/142; 264/294; 264/320; 264/325

(58) Field of Classification Search ............... 264/142, 264/294, 320, 325
See application file for complete search history.

(56) References Cited

U.S. PATENT DOCUMENTS

| | | | |
|---|---|---|---|
| 2,583,441 A | 1/1952 | Palmer | |
| 3,256,892 A | 6/1966 | Esposito, Jr. | |
| 3,963,396 A * | 6/1976 | Shotbolt et al. | 425/135 |
| 4,343,754 A | 8/1982 | Wilde et al. | |
| 4,497,765 A | 2/1985 | Wilde et al. | |
| 4,504,435 A * | 3/1985 | Orcutt | 264/272.17 |
| 4,664,280 A | 5/1987 | Whitney et al. | |
| 4,674,643 A | 6/1987 | Wilde et al. | |
| 4,921,646 A | 5/1990 | Stewart | |
| 5,642,824 A | 7/1997 | Hess et al. | |
| 5,650,113 A | 7/1997 | Gregory et al. | |
| 5,658,518 A | 8/1997 | Ingram | |
| 5,807,592 A | 9/1998 | Alieri | |
| 6,294,121 B1 | 9/2001 | Hara et al. | |
| 6,321,923 B1 | 11/2001 | Wood | |
| 6,416,312 B1 * | 7/2002 | Gonser et al. | 425/525 |

FOREIGN PATENT DOCUMENTS

EP 0 920 967 A1 6/1999

(Continued)

OTHER PUBLICATIONS

A single sheet entitled "Compression Molding Steps", undated.

(Continued)

*Primary Examiner*—Leo B. Tentoni
(74) *Attorney, Agent, or Firm*—Wood, Phillips, Katz, Clark & Mortimer (57) ABSTRACT

A molded article is produced by a method of compression molding employing a specially shaped billet of thermoplastic material which is positioned at a predetermined location in a predetermined orientation with respect to the mold cavity surfaces of a mold part. In a preferred embodiment, the billet has a generally egg shape and is located adjacent a mold surface defining a small mold cavity region between two larger cavity regions.

12 Claims, 10 Drawing Sheets

FOREIGN PATENT DOCUMENTS

| EP | 0 920 967 B1 | 2/2002 |
|---|---|---|
| RU | 2146215 C1 | 6/1995 |
| SU | 1024292 A1 | 6/1983 |
| WO | WO 01/34362 A1 | 5/2001 |
| WO | WO 2005/030456 A | 4/2005 |

OTHER PUBLICATIONS

English language translation of European patent application EP 01 810274.9 filed Mar. 19, 2001 and entitled "Method For Molding Thermoplastic Synthetic Material".

International Search Report dated Feb. 19, 2003 in the corresponding International application PCT/02/35792.

Supplementary Partial European Search Report issued Jun. 7, 2007.

* cited by examiner

COMPRESSION MOLDING PROCESS

CROSS REFERENCE TO RELATED APPLICATION(S)

This is a divisional of U.S. patent application Ser. No. 10/036,761, filed Dec. 21, 2001 now abandoned.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to a compression molded article and to a compression molding process for making the article. The process is especially suitable for making a dispensing closure for a container wherein the closure includes a body, a lid and a unitary connecting hinge.

BACKGROUND OF THE INVENTION AND TECHNICAL PROBLEMS POSED BY THE PRIOR ART

There are two basic types of closures for small, hand-held, squeezable or rigid containers of products such as lotions, shampoos, fluent food products (e.g., ketchup, bottled water, etc.), viscous food products (e.g., peanut butter), powders, cleaning compositions, and the like.

One basic type of closure is a simple one-piece cap which can be screwed on and off or which is held on the container with a releasable snap-fit bead engagement.

The other basic type of closure is a "dispensing" closure, and one form of such a dispensing closure is a hinged dispensing closure which consists of (1) a body component designed to be sealingly applied to a container neck or finish, (2) a lid component, and (3) a hinge attaching the lid to the body so as to permit the lid to be moved between an open position and a closed position. The body component has a dispensing orifice or opening which permits product to be squirted, poured, spooned, or otherwise expelled, discharged, or dispensed from the container. The lid component contains a seal member which, when the lid is in the closed position, seals the body dispensing orifice to prevent unwanted discharge of product from the container.

Hinged dispensing closures (as well as many other articles of irregular or asymmetrical shapes which may have thin members interconnecting two or more masses) are made of rigid or semi-rigid thermoplastic resins such as polyethylene, polypropylene, and the like, and have been present in the commercial market for a number of years. Packages incorporating such dispensing closures are very advantageous in providing convenience and aesthetic appeal in the dispensing of products from containers. However, dispensing closures have historically suffered from a cost disadvantage compared to more simple non-dispensing closures owing to the complexity of molding dispensing closures.

Hinged dispensing closures are typically or conventionally injection molded either as a single, unitary structure having a body, lid, and hinge or as separate body and lid components which must be subsequently assembled to produce the final, assembled closure in which the body and lid are hinged together. When a dispensing closure is injection molded as a multiple piece assembly (e.g., body piece and lid piece), a separate mold is required for each of the component pieces. Even if the dispensing closure is instead injection molded as a single, unitary component, the amount of surface area or space occupied by the unitary component in the mold is approximately twice that of a comparable mold for a simple non-dispensing closure. Thus, the injection molding process for such a dispensing closure typically requires approximately twice the investment in injection molds, injection molding presses, and other molding resource costs compared to the process for injection molding a simple non-dispensing closure for the same container finish. It would, therefore, be of significant commercial advantage to a manufacturer to have an improved method by which the manufacturer could produce, at a very high output rate and with little or no waste, hinged dispensing closures for capital investment costs and operating costs comparable to costs for producing to non-dispensing closures.

The method of injection molding has long been used to produce thermoplastic resin articles, and the method has been made more efficient over time by the introduction of improved electronic controls, hydraulic systems, etc. It has also been possible to increase the productive output of the process by the introduction of larger mold structures with an increased number of cavities (i.e., "cavitation"). In addition, molds with multiple molding surfaces (e.g., "stacked molds") are now in commercial use. Each of these improvements has helped to increase the productive output of a single molding machine, but not without size, weight, and investment cost penalties. The cost, size, and weight of the larger machines and molds increase disproportionately more with the increase in size, cavitation, and complexity of the molds and machines, while the rate of parts produced increases only in generally direct proportion to the increased number of mold cavities. In this regard, it can be seen that increases in the size and weight of larger injection molding machines could approach a practical limiting case of productive return for the required financial and resource investment.

Another method of molding plastic articles, the "compression" molding method, has existed for many years. In the earliest practice, compression molding was used to make rigid thermosetting resin plastic articles from resins such as phenol formaldehyde, urea formaldehyde, and the like. More recently, compression molding processes make semi-rigid plastic articles from thermoplastic resin such as polyethylene, polypropylene, and the like.

In the case of making thermosetting resin plastic articles by the compression molding method, the uncured resin, usually in granular or powder form, is charged into a heated mold cavity of a mold cavity segment, and the mold is closed by bringing a mold core segment against the cavity segment with great force to create high pressure in the cavity. The resultant combination of heat and pressure causes the resin material first to melt into a semi-solid state to completely fill the mold volume between the core segment and cavity segment, and subsequently to become rigid through reactive chemical cross linking of the resin. After a sufficient curing time, the molded article is removed from the mold and allowed to cool to ambient temperature before further handling or finishing.

Plastic articles made by the thermosetting resin compression molding method are typically very durable and relatively heavy owing to the physical properties of the resin. Owing to the flow limitations of the resin during the molding step, such molded articles are also typically limited in their final geometric proportions, tending to be of symmetrically shaped cylindrical, spherical, or rectangular solid configurations. In practice, the resin cannot successfully be made to flow into a highly irregular geometrical form.

In the case of making thermoplastic resin plastic articles by conventional compression molding, a precisely measured cylindrical charge of the heated, molten, thermoplastic resin is created by operation of an extruder, metering pump, and cutting knife, and the cylindrically shaped charge is dropped into a cooled cavity of a mold. The mold is then closed by forcing a mold core segment against the mold cavity segment. Upon closing the mold segments, the pressurized molten plastic resin quickly fills the volume between the core and cavity. After a brief cooling period, the mold is opened, and the finished molded article is removed from the mold, ready for immediate use. This method and products produced by it are already well-known in commerce and are described in various patents such as U.S. Pat. Nos. 4,343,754; 4,664,280; 4,674,643; 4,497,765; 5,650,113; and 5,658,518, and WO 01/34362 A1 (PCT/GB00/04175).

Compared to a commercial injection molding operation, the cycle time needed between introduction of the molten plastic into a commercial compression molding machine and removal of the finished article is shorter. Heretofore, however, much like their compression molded thermosetting counterparts, compression molded thermoplastic articles, while accommodating faster production at lower overall cost compared to their injection molded counterparts, have been limited to symmetrically shaped, principally cylindrical, configurations owing to the flow limitations of the molten thermoplastic resin as the mold segments are moved into the closed position to shape the resin into the desired article form. Because of such geometric and flow constraints, it has not been possible heretofore to cost effectively use a compression molding process to produce articles of unusual shapes, such as hinged dispensing closures, on a commercial scale.

As currently practiced in conventional commercial applications, compression molding of a thermoplastic resin article relies upon physically dropping a cylindrical shaped, measured charge or pellet of molten resin in a relatively random position in the mold cavity. In the case of a hinged dispensing closure which has a body part and a lid part of unequal physical weights and volumes, and which two parts are joined by a thin film hinge, the inventors have discovered that it is not acceptable to rely on the random placement of a symmetrical, cylindrically shaped resin charge or pellet within the mold cavity. When the mold is closed to compress such a pellet, it is not possible to reliably and consistently cause the molten plastic resin to flow into all regions of the void volume between the mold core and cavity before solidification takes place.

BRIEF SUMMARY OF THE INVENTION

An improved system for controlling the shape and placement of the resin charge within the mold cavity has been invented that now makes possible the commercial production of irregularly shaped articles, especially hinged dispensing closures, by a compression molding process.

Instead of the traditional method of simply cutting off a cylindrical pellet or billet of molten plastic extrudate and dropping it freely into the mold cavity, the extrudate is given a specific, non-cylindrical volume/shape profile in the form of a billet or pellet having a particular configuration designed to introduce the preferred amount of plastic across the various regions of the mold, such as, for example, the body, hinge, and lid regions of a dispensing closure. The precisely measured, and uniquely shaped, extrudate, pellet, or billet is preferably sheared from the face of the delivery tube, captured by a pick and place device, and then placed precisely into the desired location of the mold. Upon closing the mold to pressurize the billet or pellet, the billet or pellet quickly flows as molten plastic directly to fill the entire void volume between the preheated mold core segment and mold cavity segment.

When using this compression molding method to mold hinged dispensing closures, it is possible—with the appropriate design of (1) the extrudate shape, (2) the billet cut off parameters, and (3) the billet placement across the mold surface—to accurately and properly distribute the molding resin so as to completely fill all regions of the molded part at very high speeds, with no wasted material, and in a substantially stress-free or low stress condition. This process therefore provides the advantage of producing such dispensing closures at a significant overall cost advantage compared to the currently used injection molding method.

According to one aspect of the invention, a method is provided for making a closure having a body, a lid, and a hinge connecting the body and lid. The method comprises the following steps:

(A) providing a first mold part having (1) a first surface region defining a first side of the body, (2) a second surface region defining a first side of the hinge, and (3) a third surface region defining a first side of the lid;

(B) at a location spaced from the first mold part, providing a second mold part having (1) a first surface region defining a second side of the body, (2) a second surface region defining a second side of the hinge, and (3) a third surface region defining a second side of the lid;

(C) creating from a melt of thermoplastic material a billet (e.g., pellet, mass, etc.) having a predetermined shape;

(D) positioning the billet in a predetermined orientation with at least a portion of the billet disposed adjacent the first mold part second surface region;

(E) decreasing the space between the first and second mold parts to compress the billet so that the thermoplastic material flows between the mold parts; and (F) after the thermoplastic material has solidified to form a closure, increasing the space between the mold parts, and then removing the closure.

According to a more general aspect of the invention, a method is provided for making an article of unitary construction having a first portion, a second portion smaller than the first portion, and a third portion that is larger than the second portion. The method comprises the following steps:

(A) providing a first mold part having (1) a first surface region defining a first side of the first portion, (2) a second surface region defining a first side of the second portion, and (3) a third surface region defining a first side of the third portion;

(B) at a location spaced from the first mold part, providing a second mold part having (1) a first surface region defining a second side of the first portion, (2) a second surface region defining a second side of the second portion, and (3) a third surface region defining a second side of the third portion;

(C) creating from a melt of thermoplastic material a billet having a predetermined shape;

(D) positioning the billet in a predetermined orientation with at least a portion of the billet disposed adjacent the first mold part second surface region;

(E) decreasing the space between the first and second mold parts to compress the billet so that the thermoplastic material flows between the mold parts; and (F) after the thermoplastic material has solidified to form an article, increasing the space between the mold parts, and then removing the article.

According to yet another aspect of the invention, a closure is provided with a unitary construction of components which includes a body, a lid, and a hinge connecting the body and lid. The closure is made by the method comprising the following steps:

(A) providing a first mold part having (1) a first surface region defining a first side of the body, (2) a second surface region defining a first side of the hinge, and (3) a third surface region defining a first side of the lid;

(B) at a location spaced from the first mold part, providing a second mold part having (1) a first surface region defining a second side of the body, (2) a second surface region defining a second side of the hinge, and (3) a third surface region defining a second side of the lid;

(C) creating from a melt of thermoplastic material a billet having a predetermined shape;

(D) positioning the billet in a predetermined orientation with at least a portion of the billet disposed adjacent the first mold part second surface region;

(E) decreasing the space between the first and second mold parts to compress said billet so that the thermoplastic material flows between the mold parts; and (F) after the thermoplastic material has solidified to form a closure, increasing the space between the mold parts, and then removing the article.

According to a more general aspect of the invention, an article of unitary construction is provided with a first portion, a second portion smaller than the first portion, and a third portion that is larger than the second portion. The second portion extends between, and connects, the first and third portions. The article is made by the method comprising the following steps:

(A) providing a first mold part having (1) a first surface region defining a first side of the first portion, (2) a second surface region defining a first side of the second portion, and (3) a third surface region defining a first side of the third portion;

(B) at a location spaced from the first mold part, providing a second mold part having (1) a first surface region defining a second side of the first portion, (2) a second surface region defining a second side of the second portion, and (3) a third surface region defining a second side of the third portion;

(C) creating from a melt of thermoplastic material a billet having a predetermined shape;

(D) positioning the billet in a predetermined orientation with at least a portion of the billet disposed adjacent the first mold part second surface region;

(E) decreasing the space between the first and second mold parts to compress the billet so that said thermoplastic material flows between the mold parts; and (F) after the thermoplastic material has solidified to form an article, increasing the space between the mold parts, and then removing the article.

According to yet another aspect of the invention, a billet (e.g., pellet) is provided for compression molding. The billet is a mass of thermoplastic material having a shape with at least one large end and a smaller region. In one form of the billet for a closure molding application, the billet has a generally egg-like shape.

The billet can be characterized as a product made by the process comprising the following steps:

(A) extruding a melt of thermoplastic material through an exit orifice having a plan shape with at least one large end and a smaller region (e.g., an irregular, non-symmetric shape, such as a generally oval plan shape) to form a predetermined mass of extruded thermoplastic material extending beyond the orifice;

(B) permitting the mass to swell or bulge peripherally; and (C) severing the mass from the exit orifice to form an elongate billet (e.g., an egg shaped billet).

According to the invention, a billet can be made by a method per se comprising the following steps:

(A) extruding a melt of thermoplastic material through an exit orifice having a plan shape with at least one large end and a smaller region (e.g., an irregular, non-symmetric shape, such as a generally oval plan shape) to form a predetermined mass of extruded thermoplastic material extending beyond the orifice;

(B) permitting the mass to swell or bulge peripherally; and (C) severing the mass from the exit orifice to form an elongate billet (e.g., an egg shaped billet).

It may be readily seen that thermoplastic dispensing closures, or other types of products having irregular and/or asymmetrical shapes, may also be effectively produced by the method of the present invention.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same, FIG. 1 is a perspective view of an embodiment of an article according to the present invention, which article has the form of a dispensing closure molded according to one form of the process of the present invention, and FIG. 1 shows the closure with the lid open in the as-molded condition prior to closing the lid and mounting the closure on a container (not illustrated);

DETAILED DESCRIPTION

While this invention is susceptible of embodiment in many different forms, this specification and the accompanying drawings disclose only some specific forms as examples of the invention. The invention is not intended to be limited to the embodiments so described, however. The scope of the invention is pointed out in the appended claims.

For ease of description, most of the figures illustrating the process and article aspects of the present invention show articles and components in the typical orientations, and terms such as upper, lower, horizontal, etc., are used with reference to this position. It will be understood, however, that the processes of this invention may be effected in other orientations, and that the articles of this invention may be manufactured, stored, transported, used, and sold in orientations other than those described.

One embodiment of an article of the present invention, in the form of a dispensing closure compression molded according to the process of the present invention, is suitable for use with a variety of conventional or special containers having various designs, the details of which, although not illustrated or described, would be apparent to those having skill in the art and an understanding of such containers.

Figure 1:
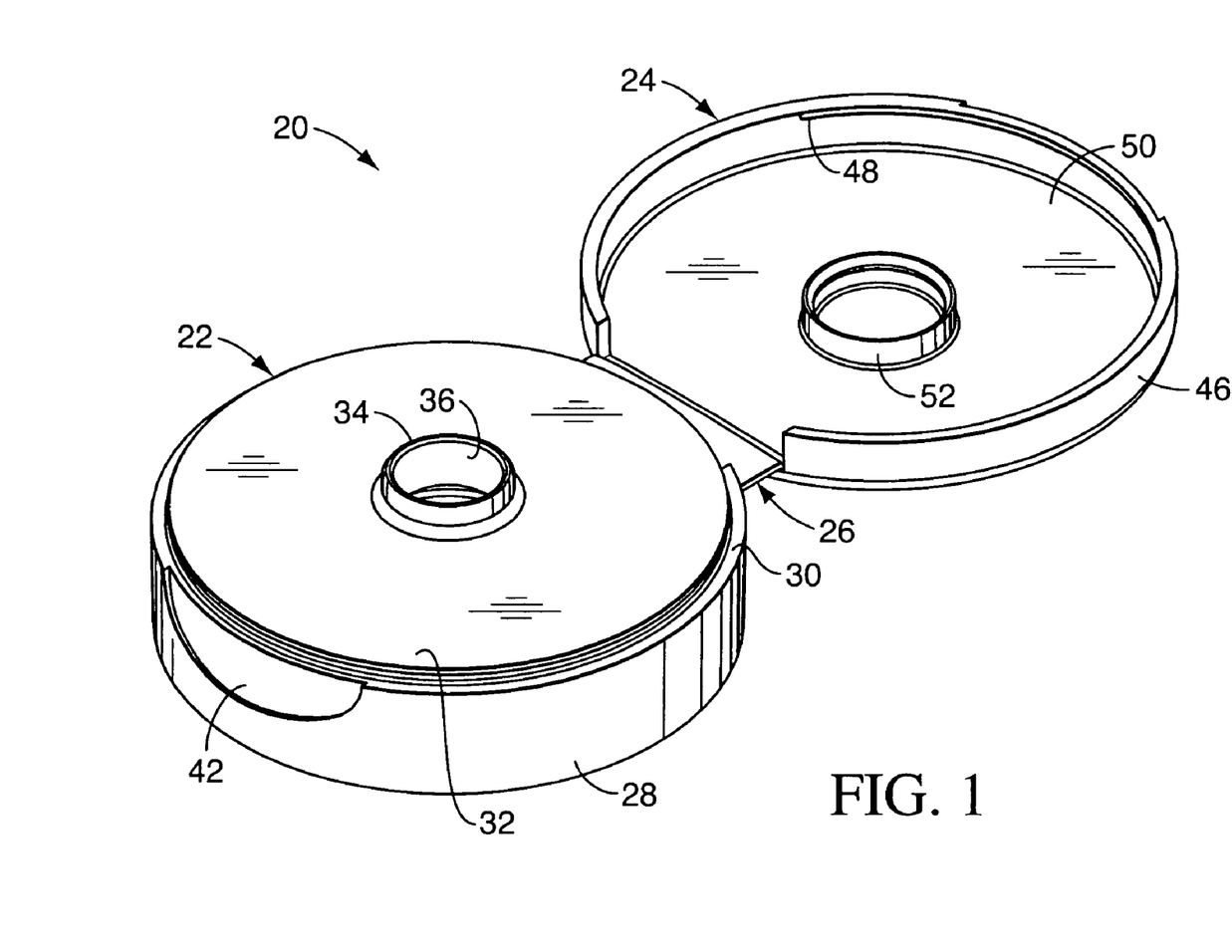
Figure 2:
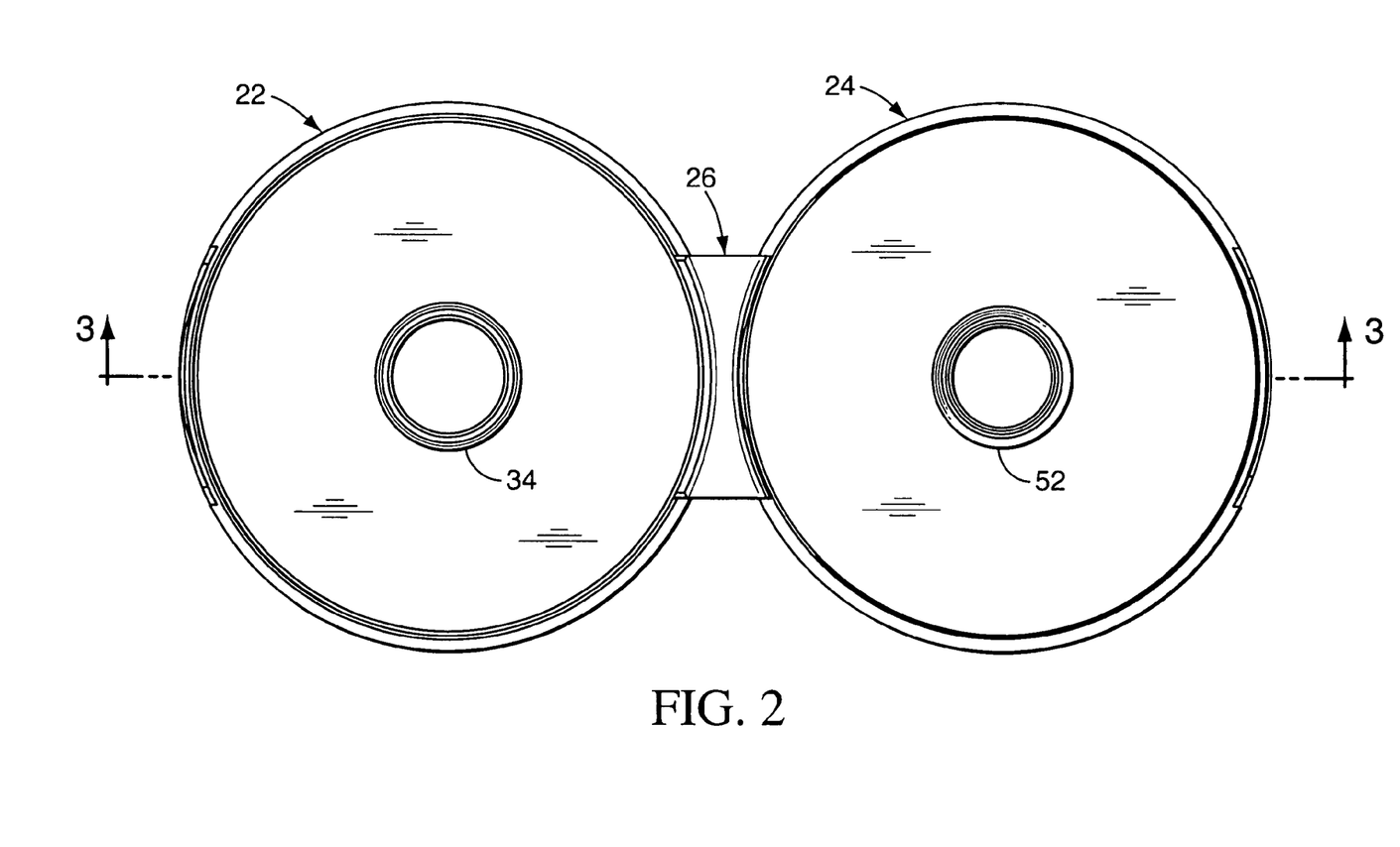
FIG. 2 is a top plan view of the closure.
Figure 3:
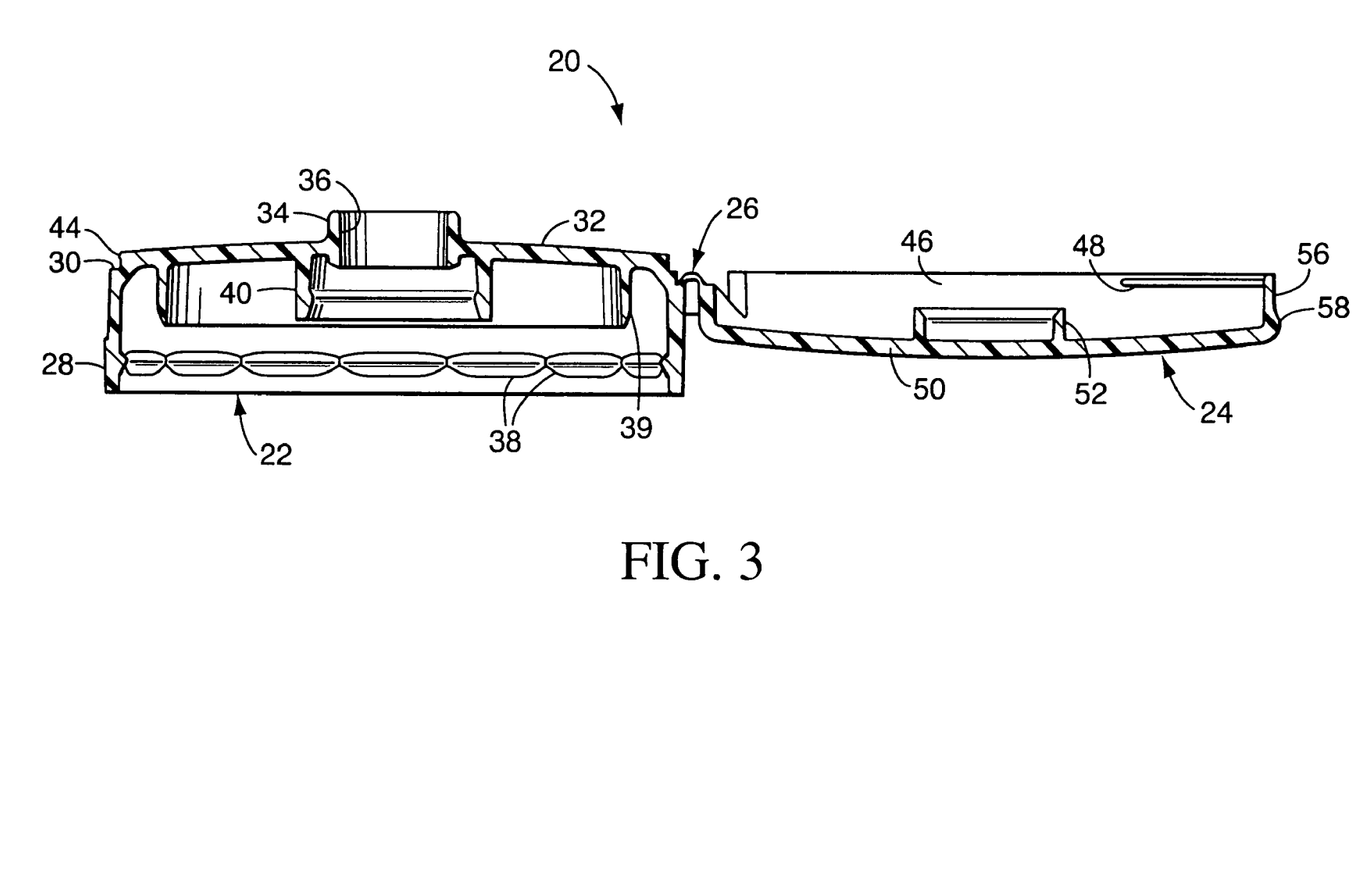
FIG. 3 is a cross-sectional view taken generally along the plane 3-3 in FIG. 2.

One embodiment of an article of the present invention in the form of a dispensing closure is illustrated in FIGS. 1-3 and is designated generally therein by reference number 20 in FIG. 1. The dispensing closure 20, which is hereinafter sometimes referred to more simply as the "closure 20," is, in the illustrated embodiment, provided as a separately manufactured unit or subassembly for mounting to the top of a container (not shown in FIG. 1).

The container typically has a conventional mouth or opening which provides access to the container interior and product contained therein. The product may be, for example, a beverage such as water, or other liquid comestible product. The product could also be any other fluent material, including, but not limited to, gases, powders, particles, and liquids (including creams, lotions, slurries, pastes, etc.). Such materials may be sold, for example, as a food product, a personal care product, an industrial or household product, or other composition (e.g., for internal or external use by humans or animals, or for use in activities involving medicine, manufacturing, commercial or household maintenance, construction, agriculture, etc.).

The container may typically have a neck or other suitable structure defining the container mouth. The neck may have (but need not have) a circular cross-sectional configuration, and the body of the container may have another cross-sectional configuration, such as an oval cross-sectional shape, for example. The container may, on the other hand, have a substantially uniform shape along its entire length or height without any neck portion of reduced size or different cross-section.

The container may typically be a squeezable container having a flexible wall or walls which can be grasped by the user and compressed to increase the internal pressure within the container so as to squeeze the product out of the container through the closure 20 when the closure 20 is open. Such a container wall typically has sufficient, inherent resiliency so that when the squeezing forces are removed, the container wall returns to its normal, unstressed shape. Such a structure is preferred in many applications, but may not be necessary or preferred in other applications. Indeed, the container may be substantially rigid. A piston could be provided in such a rigid container to aid in dispensing a product, especially a relatively viscous product. On the other hand, the interior of the container need not be pressurized at all. Instead, the product would be accessed by reaching through the open closure with a spoon or straw, or the package could be inverted to let the product discharge through the open closure solely under the influence of gravity and/or under the influence of a reduced ambient pressure exterior of the container (e.g., as by sucking on the open closure 20).

As can be seen in FIG. 1, the closure 20 includes a body 22, a lid 24, and a hinge 26 extending between, and connecting, the body 22 and lid 24. The closure 20 is compression molded, as described in detail hereinafter, to create a unitary structure, which, in the as-molded condition, has the lid 24 in a fully opened orientation as illustrated in FIG. 1.

The closure body 22 has a generally hollow, generally cylindrical base or skirt 28, an annular shoulder 30 extending radially inwardly from the top of the skirt 28, a raised deck 32, and a reduced diameter spout 34 extending upwardly from the deck 32 to define a dispensing aperture 36.

As can be seen in FIG. 3, the interior of the skirt 28 defines internal protrusions or snap beads 38. The skirt 28 is adapted to receive the upper end of a container mouth or neck (not illustrated). The skirt beads 38 are adapted to matingly engage a bead or groove on the container mouth or neck.

Alternatively, the closure skirt 28 could be provided with some other container connecting means, such as a groove (not illustrated) or thread (not illustrated) in place of the beads 38 for engaging a mating bead (not illustrated) or thread (not illustrated), respectively, in the container neck (not illustrated). In another alternative (not illustrated), the closure body skirt 28 could have a different configuration so that, after it is compression molded, the closure could be permanently fixed to a container by means of induction melting, ultrasonic melting, gluing, or the like, depending on the materials used for the container and closure body 22.

As shown in FIG. 3, the closure body 22 includes an annular plug seal 39 projecting downwardly from the closure body deck 32. The plug seal 39 is adapted to enter into the opening of the container neck and form a seal relative thereto against the interior surface of the container neck. Other forms of a seal could be employed instead.

The closure body 22 may also include an annular wall 40 for engaging a retainer (not illustrated) to hold a resilient, slit-type valve (not illustrated) adjacent the dispensing aperture 36. Such valves are disclosed in the U.S. Pat. No. 5,676,289. Such a valve, and a suitable retainer for holding the valve within the closure body, form no part of the present invention. Such a valve need not be employed at all with the closure, and the closure may merely have a dispensing orifice 36, of any suitable size for the particular dispensing application, communicating directly with the container on which the closure 20 is mounted.

As illustrated in FIG. 1, the front of the closure body skirt 28 preferably defines an indentation or thumb lift region 42, accommodating placement of the user's thumb for pushing upwardly to pry open the lid 24. The lid 24 is held in the closed configuration (not illustrated) by engagement with a lip 44 (FIG. 3) extending outwardly from the closure body deck 32. The lid 24 includes a flange 46 having an inwardly projecting rib 48 (FIG. 3) for engaging the closure body lip 44 when the lid 24 is closed.

The lid 24 includes a top wall 50 extending across the flange 46 and from which projects an annular sealing collar 52 as shown in FIG. 3. When the lid 24 is closed, the collar 52 sealingly engages the periphery of the closure body spout 34.

The closure body lid flange 46 also includes an undercut front region 56 defining an adjacent, outward projection 58 which can be engaged by the user's thumb to push the closed lid 24 upwardly away from the closure body 22 to an open position.

The closure hinge 26, as illustrated in FIG. 3, is typically a relatively thin portion of material formed as a unitary part of the closure 20 during the compression molding process. A variety of hinge designs may typically be employed. One hinge that has desirable operating characteristics is a bi-stable, snap-action hinge as illustrated in FIGS. 1-3 and as disclosed in detail in U.S. Pat. No. 5,642,824. Other kinds of hinge structures may be employed, such as a floppy hinge or tether hinge.

Because the hinge 26 is typically relatively thin compared to the adjacent body 22 and adjacent lid 24, molding of the closure from thermoplastic materials can be difficult. As described above in the section entitled "BACKGROUND OF THE INVENTION AND TECHNICAL PROBLEMS POSED BY THE PRIOR ART," molding difficulties can arise owing to flow limitations of the thermoplastic material in the mold cavity. Further, with prior art molding processes, substantial stresses may undesirably be molded into portions of the closure. However, according to a process aspect of the present invention, the above-described closure 20, as well as other closures and articles, can be effectively molded in an improved manner in a way that substantially minimizes, if not eliminates, such problems in a cost effective way.

Figure 4:
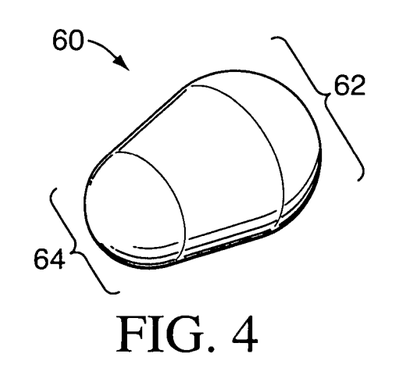
FIG. 4 is a perspective view of a pellet or billet formed from a melt of thermoplastic material for use in one form of the process of the present invention to compression mold the closure illustrated in FIGS. 1-3.

The closure 20 can be compression molded from a billet that is specially shaped and positioned in a particular orientation within a compression molding apparatus or mold assembly. FIG. 4 shows one form of a specially shaped billet designated generally by the reference number 60. The billet 60, in the preferred form for molding the particular closure 20 illustrated in FIGS. 1-3, is a mass of thermoplastic material having a shape with at least one large end 62 and a smaller region, such as a small end 64. The particular billet 60 has an irregular, non-symmetric shape, which in the preferred form illustrated in FIG. 4, is a generally egg shape.

The billet 60 may be formed from a thermoplastic resin, such as polyethylene, polypropylene, and the like.

Figure 5:
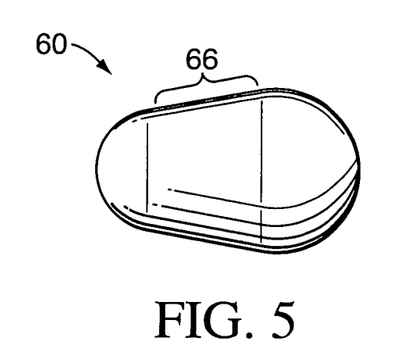
FIG. 5 is a top plan view of the billet shown in FIG. 4.

As shown in FIG. 5, the billet 60, when viewed in elevation or plan, has a generally elongate profile, and more particularly, has a generally oval profile, although a central region 66 may have a somewhat frustoconical shape.

Figure 6:
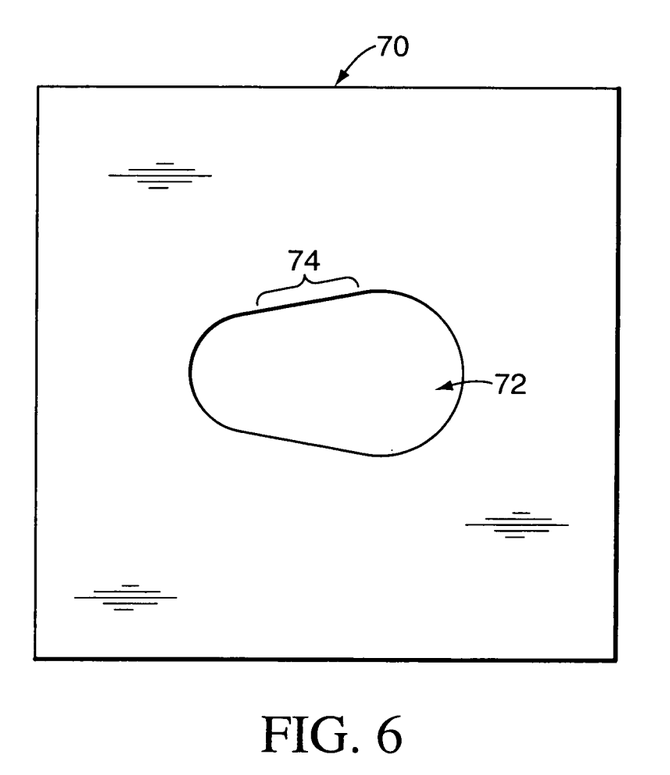
FIG. 6 is a plan view of the exit orifice plate on the discharge side of a gear pump on an extruder, which exit orifice is employed in the creation of the billet illustrated in FIGS. 4 and 5.

In a preferred form of one aspect of the process of the present invention, the billet 60 is produced from a thermoplastic melt delivered by an extruder to a metering pump that precisely meters the melt to a die plate, such as die plate 70 shown in FIG. 6. The die plate 70 defines an exit orifice 72 which, in plan view, has a generally egg shape (i.e., a shape like the lengthwise cross section of an egg) or generally oval shape, albeit with an intermediate, substantially straight-sided converging portion 74. In FIG. 6, the extruder and metering pump beneath the orifice plate 70 are not visible.

The terms "generally egg shape" and "generally oval shape," as applied to the profile of the billet 60 and as applied to the profile of the orifice 72 and as used in this patent application, contemplate irregular, non-symmetrical shapes that can also have regions with generally straight portions extending between curved portions.

Figure 7:
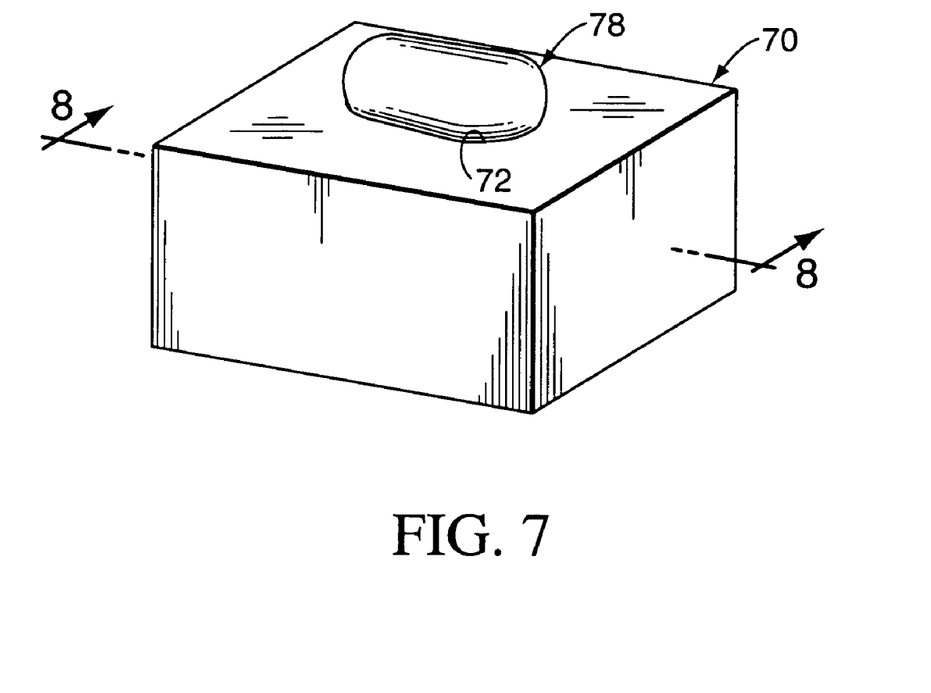
FIG. 7 is a simplified, diagrammatic, perspective view of the billet being formed during discharge of thermoplastic material from the exit orifice in the gear pump plate.
Figure 8:
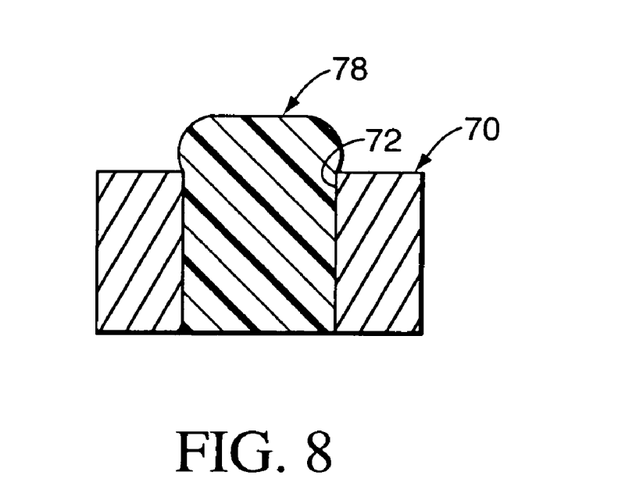
FIG. 8 is a simplified, diagrammatic, cross-sectional view taken generally along the plane 8-8 in FIG. 7.

FIG. 7 illustrates the melt or molten thermoplastic material inside the orifice plate 70 being extruded out of the exit orifice 72. The extrudate emerging from the exit orifice 72 is designated generally by the reference number 78 in FIG. 7. As can be seen in FIGS. 7 and 8, the mass of extruded material 78 is permitted to swell or bulge peripherally beyond the opening of the orifice 72.

Figure 9:
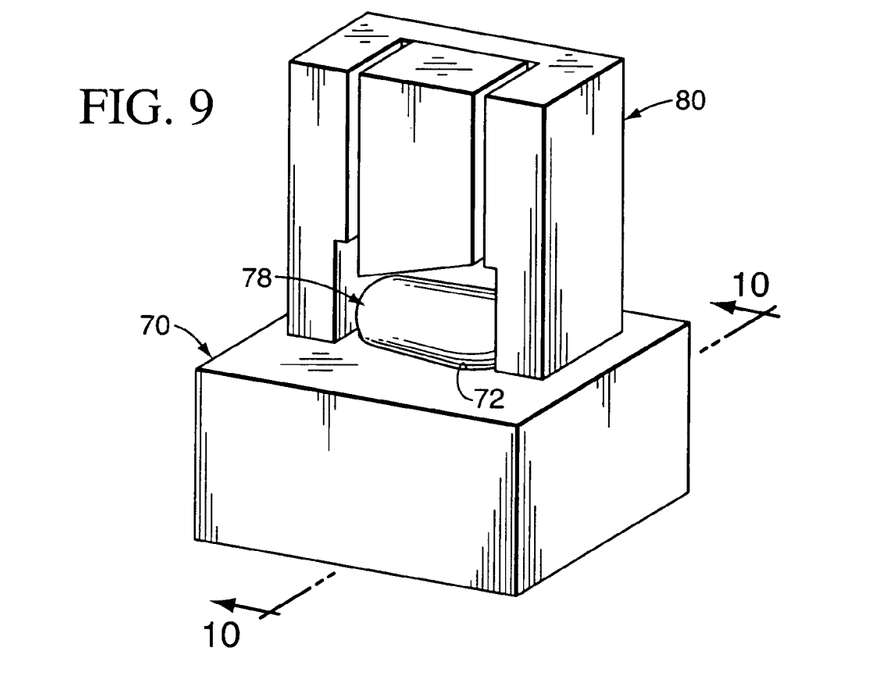
FIG. 9 is a simplified, diagrammatic, perspective view showing a removal device beginning to remove the billet from the exit orifice of the gear pump.
Figure 10:
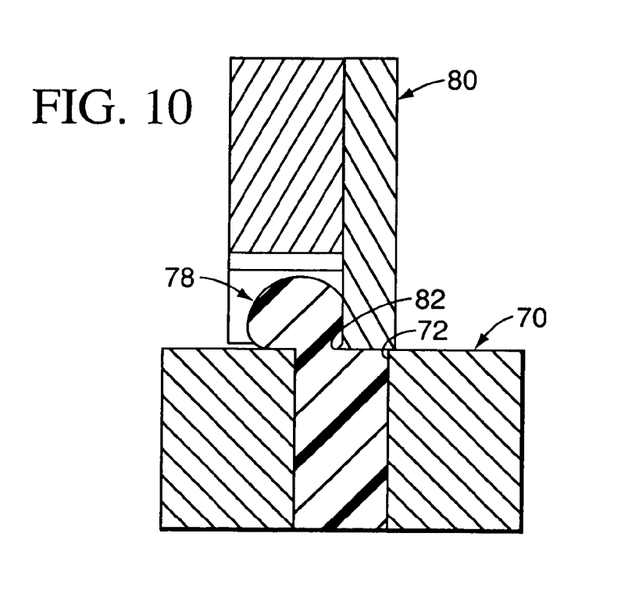
FIG. 10 is a simplified, diagrammatic, cross-sectional view taken generally along the plane 10-10 in FIG. 9.

As shown in FIGS. 9 and 10, the mass of extruded thermoplastic material 78 is severed from the remaining portion of material within the orifice 72 by a pick and place severing device which includes a lower cutting blade 82 (FIG. 10) that sweeps across the face of the orifice plate 70.

The detailed design and operation of the pick and place severing device 80 may be of any suitable conventional or special design, the details of which form no part of the present invention. Indeed, the extruded thermoplastic material 78 extending beyond the orifice 72 may be severed from the orifice 72 by other instrumentalities or even manually with a suitable knife or blade.

The pick and place severing device 80 is able to lightly engage end portions of the extruded thermoplastic material and move the extruded thermoplastic material away from the exit plate 70 to a predetermined location at a mold part. As the extruded material 78 is moved away from the orifice plate 70, the bottom of the extruded material is free to bulge peripherally downwardly to form a generally downwardly exposed oval or egg shaped surface. As the extruded thermoplastic material 78 is severed and moved away from the orifice plate 70, it may be characterized as a pellet or billet having the desired shape, in this case a generally egg shape, shown in FIG. 4 and designated by the reference number 60 as previously described above.

Figure 11:
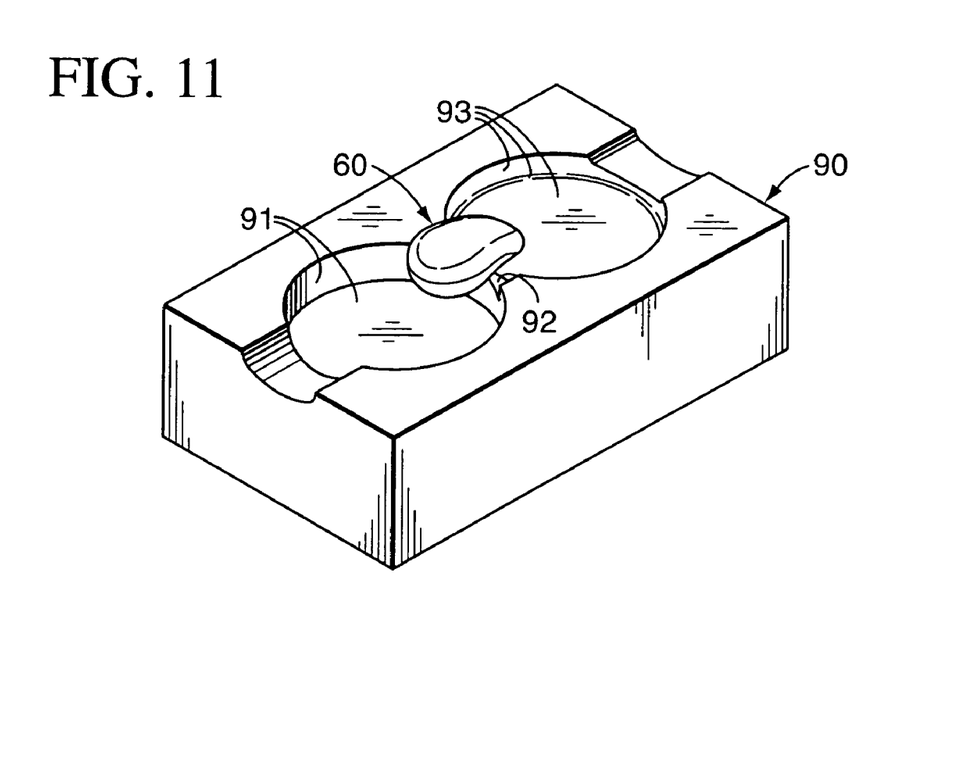
FIG. 11 is a simplified, partially diagrammatic, top perspective view of a first (lower) mold part employed in a mold assembly for compression molding the closure illustrated in FIGS. 1-3, and FIG. 11 further shows the billet having been oriented and positioned with respect to the surfaces of the first mold part.
Figure 12:
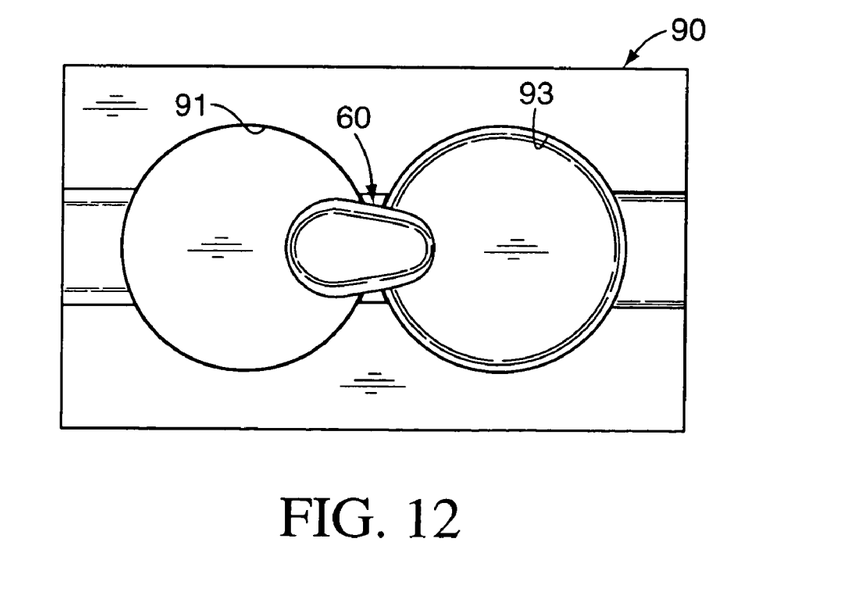
FIG. 12 is a top plan view of the mold apparatus illustrated in FIG. 11.

The billet 60 is moved, by the pick and place severing device 80, or by other means (e.g., even by hand), to a predetermined location adjacent a mold part, and the billet 60 is positioned in a predetermined orientation with respect to such a mold part. FIG. 11 shows a first mold part 90 in a simplified, diagrammatic view. The first mold part 90 has a first surface region 91 defining a first side of the closure body 22 (FIG. 1). In FIG. 11, the first surface region 91 is shown in a greatly simplified fashion without illustrating all of the various individual surfaces, protrusions, grooves, indentations, etc., that are required to define the first side of the closure body 22.

The first mold part 90 also includes a second surface region 92 defining a first side of the closure hinge 26 (FIG. 1).

The first mold part 90 also includes a third surface region 93 defining a first side of the closure lid 24 (FIG. 1). The first mold part third surface region 93 is illustrated in FIG. 11 in greatly simplified form, and does not necessarily reveal all surfaces, indentations, grooves, apertures, etc., necessary for completely defining the first side of the lid.

Figure 13:
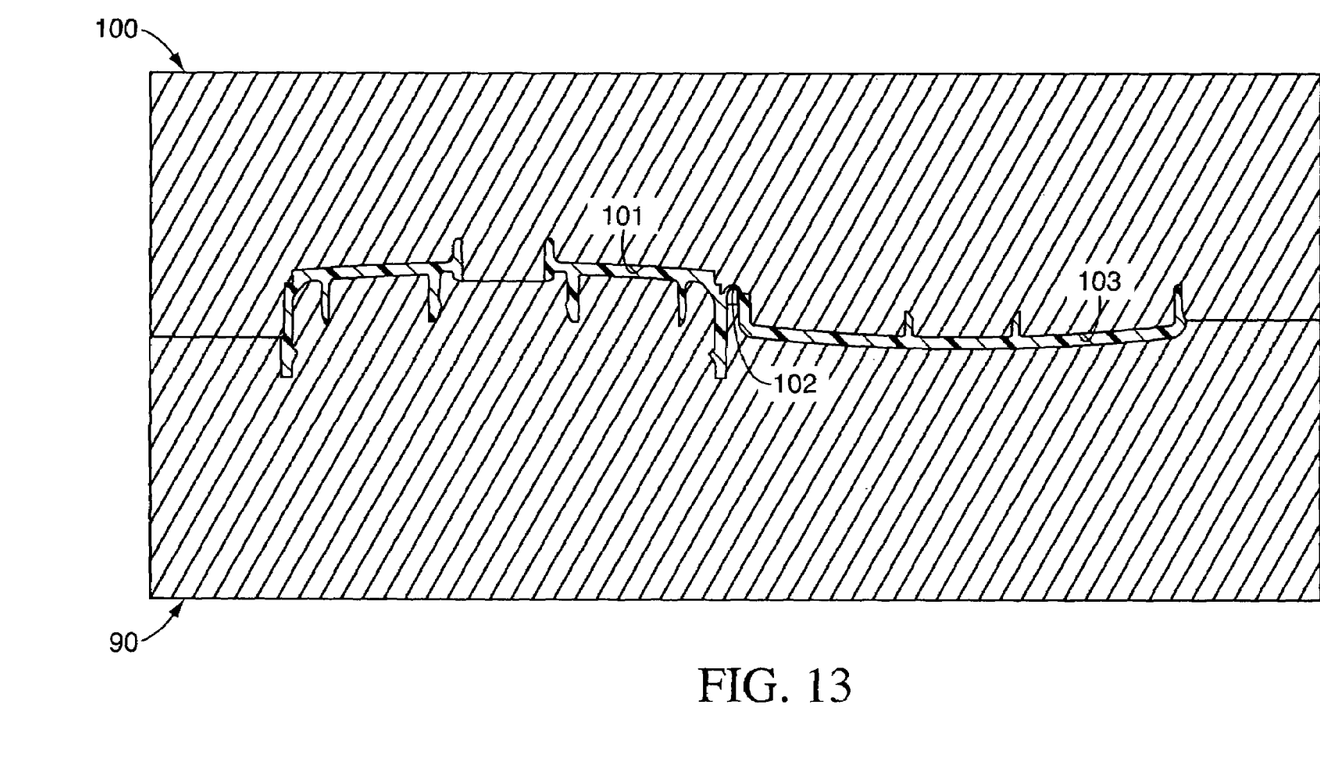
FIG. 13 is a simplified, diagrammatic, cross-sectional view of the first (lower) mold part together with a second (upper) mold part in a mold assembly in a closed condition compressing the billet so that the thermoplastic material fills the void volume between the mold parts.

The mold assembly includes a second mold part 100 which is shown in FIG. 13 in a closed condition, but which is not shown in FIG. 11. The second mold part 100 is initially spaced away from the first mold part 90 to accommodate positioning of the billet 60. As shown in FIG. 13, the second mold part 100 has a first surface region 101 defining a second side of the closure body, a second surface region 102 defining a second side of the hinge, and a third surface region 103 defining a second side of the lid.

With the first mold part 90 and the second mold part 100 initially spaced apart, the billet 60 can be positioned (as shown in FIG. 11) in a predetermined orientation with at least a portion of the billet 60 disposed adjacent the first mold part second surface region 92. In one presently preferred embodiment of the process, the billet 60 can be actually placed on the second surface region defining the first side of the hinge 92 so that the larger end is adjacent, or extends into, the closure body first surface region 91 of the first mold part, and so that the smaller end of the billet 60 is adjacent, or extends into or over, the third surface region 93 that defines the first side of the lid. If the first mold part 90 is oriented so that the first, second, and third surface regions of the first mold part 90 face generally upwardly away from the direction of the earth's gravitational force, then the billet 60 can sag somewhat on the second surface region 92 as the two ends of the billet 60 are pulled downwardly under the influence of gravity.

After the billet 60 has been placed at the appropriate location and in the appropriate orientation with respect to the first mold part 90, the space between first mold part 90 and second mold part 100 is decreased to compress the billet so that the thermoplastic material flows between the mold parts as illustrated in FIG. 13. Either or both of the first and second mold parts could be moved toward the other. Such movement of the first and second mold parts should be understood as decreasing the distance between opposing surfaces of the two mold parts to desired predetermined spacings, and such movement can be effected by moving only the first mold part, or only the second mold part, or alternatively, both mold parts.

When the mold parts close, to the position illustrated in FIG. 13, a predetermined spatial configuration or volume exists between the mold parts 90 and 100 to define the void volume corresponding to the molded closure 20 (as shown molded in FIG. 1). The molten plastic of the billet 60 quickly flows directly to fill such void volume within the mold. Owing to the orientation and positioning of the billet 60 (as shown in FIG. 11), the molten thermoplastic material is evenly distributed and flows rapidly to fill all regions of the closure, with no wasted material, and in a substantially stress-free condition.

With respect to FIG. 1, it will be appreciated that the larger mass closure body region of the closure requires more thermoplastic material, and thus the billet 60 is oriented with the larger end of the billet projecting into the closure body region of the first mold part 90 (and into the corresponding region of the second mold part 100 when the second mold part 100 is subsequently closed). Conversely, as can be seen in FIG. 11, the volume of the closure lid cavity defined by the mold surface region 93 is less. Less thermoplastic material is required for the lid region. Thus, the billet 60 is oriented so that its smaller end is adjacent the first mold part lid region mold surface region 93 (and adjacent the second mold part lid molding surface when the second mold part 100 is subsequently closed).

Further, it will be appreciated with reference to FIG. 13 that the hinge region between the closure body and closure lid portions of the mold cavity is relatively thin or small compared to the closure body and closure lid portions. The hinge portion is smaller than the body portion, and the lid portion is larger than the hinge portion. The hinge portion of the mold cavity, when the first mold part 90 and second mold 100 are closed, presents a very small flow region and tends to restrict the flow of a thermoplastic material. According to the present invention, the billet 60 is positioned adjacent the hinge area of the mold parts so that the thermoplastic material needs only a slight amount of lateral flow to completely fill the relatively thin hinge region of the mold cavity. This assures that the hinge region will be quickly and completely filled with the necessary amount of thermoplastic material.

Placement of the billet 60 so that opposite end portions of the billet are each positioned adjacent the body mold cavity portion and lid mold cavity portion, respectively, accommodates the flow of the thermoplastic material from the billet end portions directly throughout the respective body and lid portions of the cavity without requiring flow of thermoplastic material from the body cavity region through the thin hinge cavity region to the lid cavity region, or vice versa.

After the thermoplastic material has solidified to form the closure, the space between the mold parts is increased, and the molded closure is removed.

Figure 14:
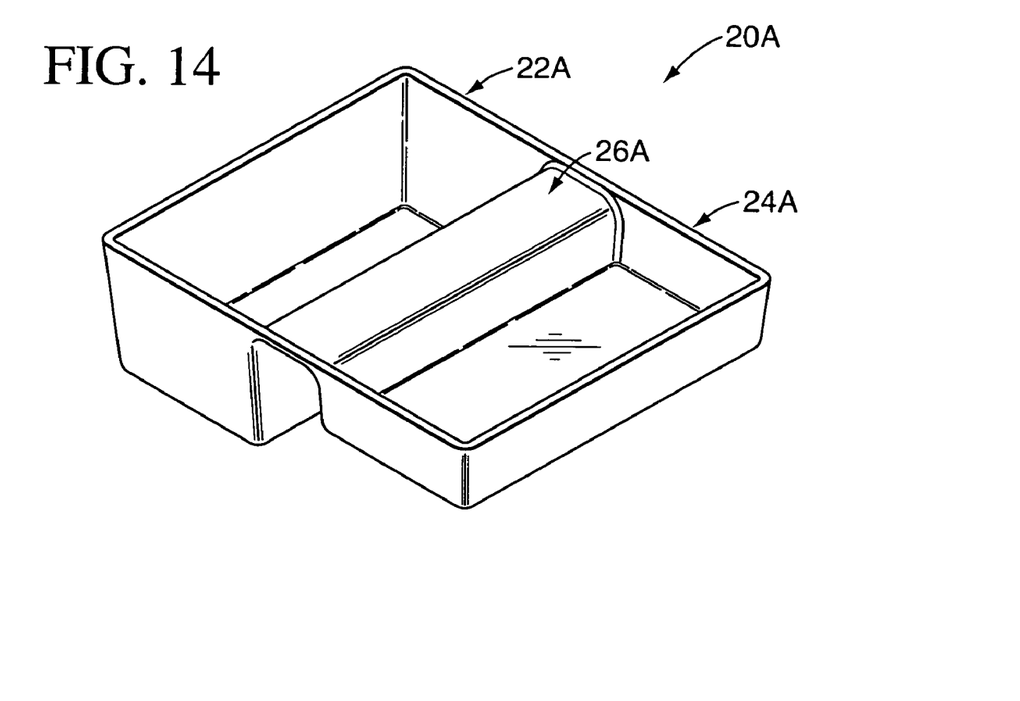
FIG. 14 is a simplified, diagrammatic, perspective view of another embodiment of an article which can be compression molded according to the principles of the present invention, and the article is a box with a body and lid connected by a thin hinge extending between the body and the lid.

An alternate embodiment of an article that can be compression molded according to the teachings of the present invention is illustrated in FIGS. 14-17 and is designated therein generally by the reference number 20A. As can be seen in FIG. 14, the article 20A is a relatively simple container having a body 22A, a lid 24A, and a hinge 26A which extends between, and connects, the body 22A and lid 24A. Compared to the body 22A and lid 24A, the hinge 26A is relatively thin and contains much less thermoplastic material.

Figure 15:
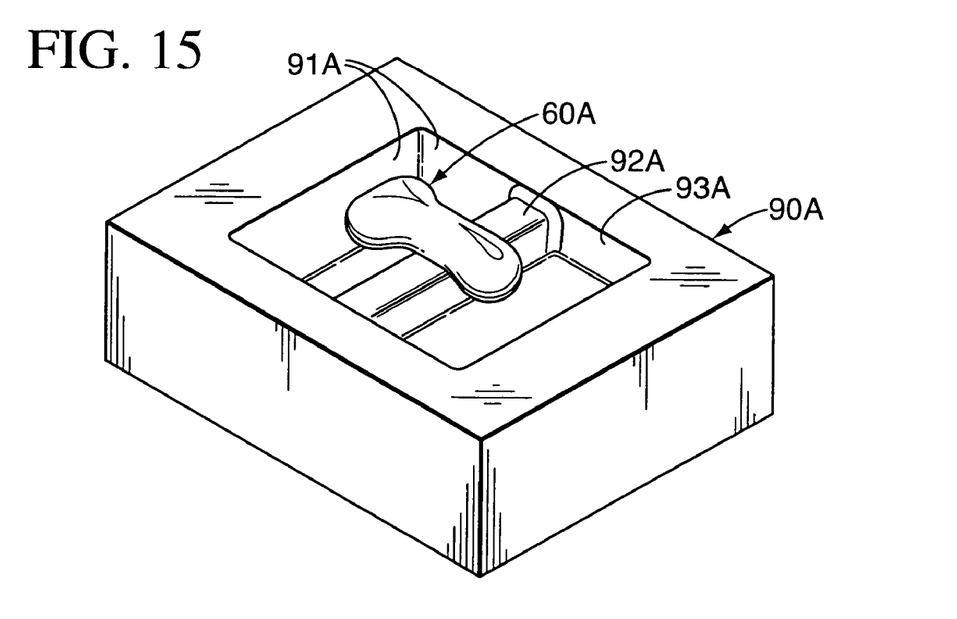
FIG. 15 is a simplified, diagrammatic, perspective view of a first (lower) mold part that can be employed in a mold assembly with a second (upper) mold part (not illustrated) for compression molding the article illustrated in FIG. 14, and FIG. 15 further shows a pellet or billet of thermoplastic material oriented and positioned with respect to the first mold part.

As illustrated in FIG. 15, the first mold part 90A includes a first surface region 91 A defining a first side of the container body, a second surface region 92A defining a first side of the hinge 26A, and a third surface region 93A defining a first side of the lid 24A.

FIG. 15 further illustrates a lower or first mold part 90A for cooperating with an upper or second mold part (not illustrated) to form the container 20A in the molded open position illustrated in FIG. 14. FIG. 15 also shows thermoplastic material, in the form of a billet 60A, having a predetermined shape and located at a predetermined position in a predetermined orientation relative to the first mold part 90A. In the preferred embodiment illustrated, the billet 60A is placed against, and is initially supported by, the second surface region 92A of the first mold part 90A.

The billet 60B is preferably formed in a manner analogous to the method for forming the billet 60 described above. In particular, the billet 60A is extruded from a melt of thermoplastic material from an extruder and is fed by a metering pump through an orifice defined in a plate. The orifice has a plan shape or configuration which is the same as the plan view shape of the billet 60A as viewed in FIG. 16. However, the orifice has somewhat smaller dimensions than the billet 60A, and the billet 60A is formed by a swelling or bulging of the thermoplastic material on the discharge side of the orifice.

The billet 60A can be cut from the extruded melt at the discharge plane of the orifice with a suitable knife by hand or by an appropriate apparatus, such as the apparatus disclosed above with respect to severing the billet 60 as illustrated in FIGS. 9 and 10. Such an apparatus may include a pick and place feature for holding and transferring the severed billet 60A to the appropriate location adjacent a mold part and for orienting the billet 60A in a predetermined orientation relative to the mold part. The removal and placement of the billet 60A may be an entirely manual process or may be automated with appropriate devices. The particular method and/or devices employed for removing and placing the billet form no part of the present invention.

Figure 16:
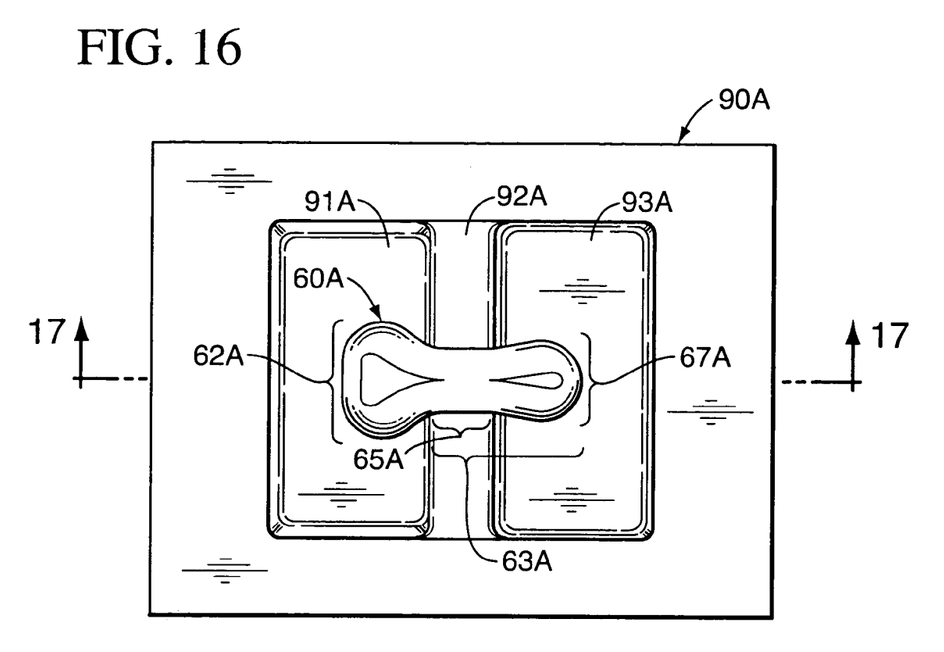
FIG. 16 is a plan view of the mold part and billet illustrated in FIG. 15.

As can be seen in the plan view of FIG. 16, the billet 60A has one large end 62A and a reduced width extending portion 63A. The reduced width extending portion 63A has a reduced width portion 65A and a slightly enlarged end portion 67A. The large end 62A has a generally dog bone end shape.

The billet 60A is oriented so that the larger, dog bone end shape 62A extends into the larger body cavity of the mold parts. The reduced width region 65A is oriented over the narrow and thin hinge region 92A. At the other end of the billet 60A, the end portion 67A extends over the smaller volume lid region of the mold part.

Figure 17:
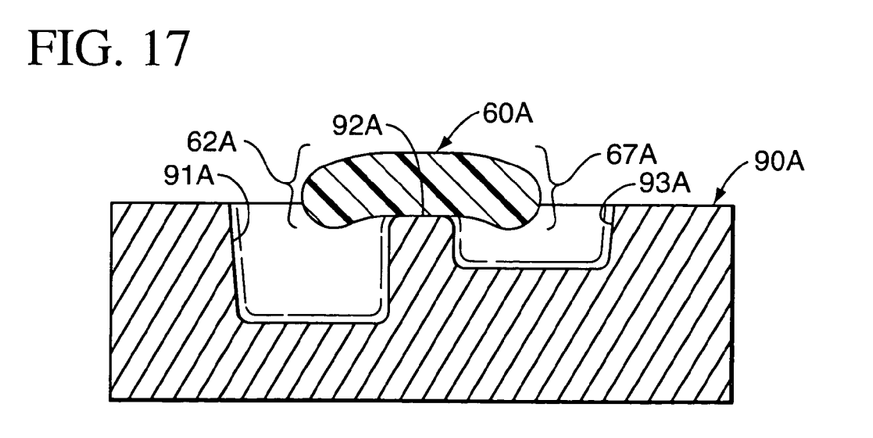
FIG. 17 is a cross-sectional view taken generally along the plane 17-17 in FIG. 16.

As shown in FIG. 17, when the first mold part 90A is oriented horizontally as a lower or bottom mold part and the billet 60A is placed on the first mold part second surface region 92A, the billet 60A may sag downwardly somewhat so that the billet ends 62A and 67A sag somewhat into the regions of the mold cavity defined by the lower mold part 90A.

After the billet 60A is properly located at a predetermined position and orientation with respect to the first mold part 90A, the billet 60A is compressed between the first mold part 90A and a second mold part (not illustrated). The second mold part has a first surface region defining a second side of the body, a second surface region defining a second side of the hinge, and a third surface region defining a second side of the lid. The billet compression step may be effected by moving the two mold parts together to decrease the distance between the two mold parts. The process could maintain the lower, first mold part stationary, while moving only the upper, second mold part toward the stationary first mold part. Alternatively, the process could maintain the upper mold part stationary while moving the lower, first mold part toward the stationary upper mold part. Also, each of the lower and upper mold parts could be simultaneously moved toward each other.

Owing to the shape of the billet 60A and owing to the orientation of the billet 60A with respect to the mold parts, the billet larger end 62A is positioned adjacent the larger body mold cavity which is defined in part by the first mold surface region 91A. Thus, the article body which requires the most volume of thermoplastic material can be compression molded mostly from the adjacent larger mass of thermoplastic material in the billet large end 62A.

The thin hinge region 92A does not require as much thermoplastic material, and thus the billet reduced width portion 65A (FIG. 16) is located adjacent the hinge region defined by the first mold part surface 92A. Because the smaller billet portion 65A is located right at the hinge region, the thermoplastic material does not have to flow very far to fully and completely occupy the mold cavity region defining the hinge.

The lid, which requires more thermoplastic material than the hinge portion but less thermoplastic material than the body, is completely filled during the compression molding step with thermoplastic material primarily from the billet end 67A which is adjacent the lid mold surface region 93A. Very little, or no, thermoplastic material needs to flow during the compression molding step through the hinge region from either the lid region to the body region, or from the body region to the lid region. The molten plastic from the different portions of the compressed billet 60A can quickly flow directly to the surrounding regions of the mold cavity so as to properly distribute the thermoplastic material to completely fill in all the void volume within the mold regions with no wasted material and in a substantially stress-free condition.

After the thermoplastic material has solidified to form the article 20A, the space between the mold parts is increased, and the article is removed.

The process for molding the article 20A, as well as the closure 20, as described above, can be effected at relatively high speeds with a significant overall cost advantage compared to currently used injection molding methods.

The process of the present invention is readily adapted for use in molding articles, including thermoplastic dispensing closures, that have regular or irregular shapes, and that have symmetrical or asymmetrical shapes.

It will be appreciated that the formation of a billet from an extrusion of thermoplastic material may occur in other orientations than described above with respect to billets 60 and 60A. For example, the billet may be formed horizontally, or downwardly, instead of generally upwardly (with respect to the force of gravity as illustrated in the accompanying figures illustrating the formation of the billets 60 and 60A).

It will also be appreciated that the mold parts need not be oriented generally horizontally for vertical movement. Instead, the parting plane of the mold parts could be oriented at an angle, or even vertically, so long as an appropriate system is employed for (1) positioning the billet at the predetermined location and orientation relative to the mold parts, and (2) maintaining that position until the mold parts are closed.

The present invention may be employed to provide a variety of compression molded articles of the general type having a small or thin region connecting two larger regions, where the flow of thermoplastic material must be controlled and accommodated so as to effectively and properly fill all of the void space in the mold cavity and in a way that results in a substantially stress-free molded article.

It will be readily apparent from the foregoing detailed description of the invention and from the illustrations thereof that numerous variations and modifications may be effected without departing from the true spirit and scope of the novel concepts or principles of this invention.

What is claimed is:

1. A method for making a closure having a body, a lid, and a hinge connecting said body and lid, said method comprising the steps of:
   (A) providing a first mold part having (1) a first surface region defining a first side of said body, (2) a second surface region defining a first side of said hinge, and (3) a third surface region defining a first side of said lid;
   (B) at a location spaced from said first mold part, providing a second mold part having (1) a first surface region defining a second side of said body, (2) a second surface region defining a second side of said hinge, and (3) a third surface region defining a second side of said lid;

(C) creating from a melt of thermoplastic material a billet having a predetermined shape in the form of a non-symmetrical shape with a large end and a small end;

(D) positioning said billet in a predetermined orientation with (1) said small end adjacent, and extending over a portion of, said first mold part third surface region, (2) said large end adjacent, and extending over a portion of, said first mold part first surface region, and (3) at least a portion of said billet disposed adjacent said first mold part second surface region;

(E) decreasing the space between said first and second mold parts to compress said billet so that said thermoplastic material flows between said mold parts; and (F) after said thermoplastic material has solidified to form a closure, increasing the space between said mold parts, and then removing said closure.

2. The method in accordance with claim 1 in which said step (D) includes placing at least a portion of said billet against said first mold part second surface region.

3. The method in accordance with claim 2 in which
said step (A) includes orienting said first mold part so that said first mold part first, second, and third surface regions face generally away from the direction of the earth's gravitational force; and
said step (D) includes positioning said billet directly on said first mold part so that at least a portion of said billet is supported by said first mold part second surface region.

4. The method in accordance with claim 1 in which step (C) includes creating said billet to have a generally egg shape with said large end and said small end.

5. The method in accordance with claim 4 in which step (D) includes positioning said billet with said small end adjacent and sagging toward said first mold part third surface region, and with said large end adjacent and sagging toward said first mold part first surface region.

6. The method accordance with claim 1 in which step (C) includes extruding said melt through a generally oval shape exit orifice.

7. A method for making an article of unitary construction having a first portion, a second portion smaller than said first portion, and a third portion that is larger than said second portion, said method comprising the steps of:

(A) providing a first mold part having (1) a first surface region defining a first side of said first portion, (2) a second surface region defining a first side of said second portion, and (3) a third surface region defining a first side of said third portion;

(B) at a location spaced from said first mold part, providing a second mold part having (1) a first surface region defining a second side of said first portion, (2) a second surface region defining a second side of said second portion, and (3) a third surface region defining a second side of said third portion;

(C) creating from a melt of thermoplastic material a billet having a predetermined shape in the form of a non-symmetrical shape with a large end and a small end;

(D) positioning said billet in a predetermined orientation with (1) said small end adjacent, and extending over a portion of, said first mold part third surface region, (2) said large end adjacent, and extending over a portion of, said first mold part first surface region, and (3) at least a portion of said billet disposed adjacent said first mold part second surface region;

(E) decreasing the space between said first and second mold parts to compress said billet so that said thermoplastic material flows between said mold parts; and (F) after said thermoplastic material has solidified to form an article, increasing the space between said mold parts, and then removing said article.

8. The method in accordance with claim 7 in which said step (D) includes placing at least a portion of said billet against said first mold part second surface region.

9. The method in accordance with claim 8 in which
said step (A) includes orienting said first mold part so that said first mold part first, second, and third surface regions face generally away from the direction of the earth's gravitational force; and
said step (D) includes positioning said billet directly on said first mold part so that at least a portion of said billet is supported by said first mold part second surface region.

10. The method in accordance with claim 7 in which step (C) includes creating said billet to have a generally egg shape with said large end and said small end.

11. The method in accordance with claim 10 in which step (D) includes positioning said billet with said small end adjacent and sagging toward said first mold part third surface region, and with said large end adjacent and sagging toward said first mold part first surface region.

12. The method accordance with claim 7 in which step (C) includes extruding said melt through a generally oval shape exit orifice.

* * * * *